(12) United States Patent
Gunther (10) Patent No.: US 9,167,628 B2
(45) Date of Patent: Oct. 20, 2015

(54) ELECTRIC HEATING DEVICE FOR HOT RUNNER SYSTEMS

(75) Inventor: Herbert Gunther, Allendorf (DE)

(73) Assignee: GÜNTHER Heisskanaltechnik, Frankenberg (DE)

( * ) Notice: Subject to any disclaimer, the term of this patent is extended or adjusted under 35 U.S.C. 154(b) by 1060 days.

(21) Appl. No.: 12/311,901

(22) PCT Filed: Sep. 14, 2007

(86) PCT No.: PCT/EP2007/007998
§ 371 (c)(1),
(2), (4) Date: Apr. 17, 2009

(87) PCT Pub. No.: WO2008/046481
PCT Pub. Date: Apr. 24, 2008

(65) Prior Publication Data
US 2010/0003358 A1    Jan. 7, 2010

(30) Foreign Application Priority Data
Oct. 18, 2006   (DE) .................. 10 2006 049 667

(51) Int. Cl.
*F27B 14/00*   (2006.01)
*H05B 3/42*   (2006.01)
*B29C 45/27*   (2006.01)

(52) U.S. Cl.
CPC .............. *H05B 3/42* (2013.01); *B29C 45/2737* (2013.01); *B29C 2045/274* (2013.01); *B29C 2045/2743* (2013.01); *B29C 2045/2745* (2013.01); *B29C 2045/2746* (2013.01); *B29C 2945/7604* (2013.01); *B29C 2945/7628* (2013.01); *Y10T 29/49083* (2015.01)

(58) Field of Classification Search
CPC .............. B29C 2945/7628; B29C 2945/7604; B29C 2045/2746; B29C 2045/2745; B29C 2045/2743; B29C 2045/274; B29C 45/2737; H05B 3/42
USPC .......................................... 219/424
See application file for complete search history.

(56) References Cited

U.S. PATENT DOCUMENTS

| | | | |
|---|---|---|---|
| 3,935,972 A * | 2/1976 | Tsunemoto et al. ........ 222/146.5 |
| 4,558,210 A | 12/1985 | Leary | |
| 4,758,302 A * | 7/1988 | Hannover ................... 156/391 |
| 5,220,154 A * | 6/1993 | Gunther ..................... 219/421 |
| 5,360,333 A * | 11/1994 | Schmidt ...................... 425/549 |
| 5,569,475 A * | 10/1996 | Adas et al. .................. 425/549 |
| 5,928,549 A * | 7/1999 | Hitzigrath ................... 219/548 |
| 5,954,094 A * | 9/1999 | Base ............................ 138/89 |
| 5,973,296 A * | 10/1999 | Juliano et al. ............... 219/424 |
| 6,009,616 A | 1/2000 | Gellert | |

(Continued)

FOREIGN PATENT DOCUMENTS

DE   35 36 268   4/1987
DE   295 07 848   7/1995

(Continued)

*Primary Examiner* — Dana Ross
*Assistant Examiner* — Renee L Miller
(74) *Attorney, Agent, or Firm* — Clark & Brody (57) ABSTRACT

An electric heating unit for hot runner systems, and in particular for hot runner nozzles and/or hot runner manifolds includes at least one tubular or muff-like support and at least one heating layer fitted with heating conductor tracks. The heating layer is a fired foil or a fired thick-film paste and the muff-like support is able to be slipped onto a material feed pipe.

27 Claims, 7 Drawing Sheets

(56) References Cited

U.S. PATENT DOCUMENTS

| | | | |
|---|---|---|---|
| 6,043,466 A * | 3/2000 | Jenko et al. | 219/535 |
| 6,137,089 A * | 10/2000 | Pragt et al. | 219/438 |
| 6,164,954 A * | 12/2000 | Mortazavi et al. | 425/549 |
| 6,222,166 B1 * | 4/2001 | Lin et al. | 219/538 |
| 6,305,923 B1 * | 10/2001 | Godwin et al. | 425/143 |
| 6,323,465 B1 * | 11/2001 | Gellert et al. | 219/421 |
| 6,474,986 B2 * | 11/2002 | Oda et al. | 432/247 |
| 6,516,971 B1 * | 2/2003 | Reece et al. | 222/146.5 |
| 6,530,776 B1 * | 3/2003 | Pilavdzic et al. | 425/549 |
| 6,632,086 B1 * | 10/2003 | Antczak et al. | 432/13 |
| 6,649,112 B2 * | 11/2003 | Steil et al. | 264/328.14 |
| 6,797,925 B1 * | 9/2004 | Gunther et al. | 219/424 |
| 6,805,549 B2 * | 10/2004 | Gunther | 425/549 |
| 7,044,191 B2 * | 5/2006 | Fischer et al. | 164/112 |
| 7,105,123 B2 * | 9/2006 | Trudeau | 264/328.8 |
| 7,118,703 B2 * | 10/2006 | Trudeau | 264/328.14 |
| 7,241,131 B1 * | 7/2007 | Booth et al. | 425/549 |
| 7,342,206 B2 * | 3/2008 | Ptasienski et al. | 219/535 |
| 8,425,216 B2 * | 4/2013 | Catoen | 425/135 |
| 2002/0089090 A1 * | 7/2002 | Steil et al. | 264/328.14 |
| 2003/0003188 A1 * | 1/2003 | Gunther | 425/549 |
| 2004/0166194 A1 * | 8/2004 | Trudeau | 425/568 |
| 2005/0145616 A1 * | 7/2005 | Ptasienski et al. | 219/535 |
| 2006/0243412 A1 * | 11/2006 | Fischer et al. | 164/46 |
| 2006/0263469 A1 * | 11/2006 | Feick | 425/572 |
| 2007/0241207 A1 * | 10/2007 | Enrietti | 239/135 |

FOREIGN PATENT DOCUMENTS

| | | |
|---|---|---|
| DE | 199 41 038 | 3/2001 |
| DE | 202 11 328 | 10/2002 |
| EP | 0 028 153 | 5/1981 |
| WO | 97/03540 | 1/1997 |
| WO | 01/54882 | 8/2001 |
| WO | 2004/036956 | 4/2004 |
| WO | 2008/046481 | 4/2008 |

* cited by examiner

ELECTRIC HEATING DEVICE FOR HOT RUNNER SYSTEMS

The present invention relates to an electric heating unit for hot runner systems, in particular for hot runner nozzles and/or hot runner manifolds.

Hot runner systems are used in injection molds to feed a flowable material, for instance a plastic melt, at a predetermined temperature and at high pressure to a separable mold insert. Most systems comprise a material feed pipe fitted with a flow duct terminating into a nozzle mouth. Said mouth subtends at its end a nozzle discharge aperture issuing through a gate in the mold insert (mold nest). To prevent the flowable material within the material feed pipe from cooling prematurely, one or more heating units are used assuring as uniform as possible uniform temperature as far as into said nozzle mouth.

Illustratively the electric heating unit may be a separate component fitted with a winding heating element integrated into a tubular casing and circumferentially affixable on the material feed pipe. As illustratively disclosed in the German patent document U 295 07 848 or the U.S. Pat. No. 4,558,210, said casing is a rigid structure affixed in the axial direction by additional bracing or clamping means on the material feed pipe. Alternatively heating may be carried out using heating strips or a flexible heating mat between electrically insulating layers and where called for of different thermal conductivities. In this respect the European patent document EP B1-0 028 153 provides thermally conducting adhesive strips whereas the WO 97/03540 patent document uses flexible straps with velcro or snap-in connections.

The known heating units incur among other drawbacks that of being fairly bulky, so that much space must be made available to the hot runner nozzles when being installed, such a feature in most applications being undesirable, in particular where small nest separations are required. Such relatively large dimensions also entail high heating output, negatively affecting energy consumption. Moreover, the entailed large thermal inertias lengthen the heating and cooling phases, thereby limiting increased productivity.

The German patent document DE-A 199 41 034 proposes eliminating such difficulties by integrally depositing on at least one material feed pipe wall associated with a flow duct at least one insulating layer and at least one heating layer fitted with heating conductor tracks by direct coating, in other words, to design integrally the heating unit and the material feed pipe. Illustratively said direct coating may be implemented by means of the foil, thick-film or screen printing techniques, where, following deposition, the layers in each case are baked, hereafter "fired", separately or simultaneously (co-fired). The integrated layered deposition of the heating unit assures a durably firm connection to the flow duct wall and thereby firm affixation to the hot runner manifold or the hot runner nozzle. Because of the small thicknesses attained by direct deposition, the heating unit only occupies little space, whereby, compared with the previously cited heating units and at nearly equal output parameters, very high compactness may be achieved. Moreover the output density may be raised because the heat is directly generated on and removed from the surface of the hot runner element to be heated. Overheating the most delicate heating elements is precluded thereby. Again the nozzle may be accurately and rapidly heated, favorably affecting the full production run.

However such heating units integral with the material feed pipe incur the drawback they cannot be exchanged in case of emergency and can be repaired only with difficulty. Moreover the substance selection regarding the individual layer is restricted to such of which the firing temperature is low enough not to affect the microstructure of the material feed pipe, which typically is made of tool steel, and which also is exposed to said firing temperatures. Accordingly the firing temperatures of the individual layers may not exceed the thermal treatment temperature of the material feed pipe.

Accordingly the object of the present invention is to circumvent the above and further drawbacks of the state of the art and to offer an improved heating unit allowing simple and economical manufacture. In particular said objective shall relate to a corresponding manufacturing method, an improved hot runner system and an improved hot runner nozzle.

The main features of the present invention are defined in the claims 1, 23, 25 and 28. Embodiment modes are defined in claims 2 through 22, 24, 26 through 27 and 29 through 34.

According to the present invention, an electric heating unit for hot runner systems, in particular for hot runner nozzles and/or hot runner manifolds, comprises at least one tubular or muff-like support and at least one heating layer fitted with heating conductor tracks, said heating layer being a fired foil or a fired thick film.

Because of the tubular or muff-like design of the support, the heating unit as a whole may be illustratively slipped onto a hot runner nozzle, resulting in an overall two-part assembly of the heating unit and the material feed pipe. Accordingly the heating unit is exchangeable. The heating layer being a fired foil or a fired thick film paste, the heating unit's thicknesses are tiny and accordingly occupy only little space, whereby, compared to other mechanically detachable heating units and at nearly equal output features, extremely compact hot runner nozzles can be implemented by the present invention. Moreover its heating unit may be manufactured in simple and economical manner, lowering such manufacturing costs.

Preferably at least one electrically insulating cover layer is present above the heating layer and covers and electrically insulates the support from its ambience. Advantageous this cover layer shall be the outermost layer of the heating unit.

Preferably at least one further layer acting as the temperature sensor is used to detect the actual temperature in the flow duct, its electrical resistance being temperature dependent. Due to the variable electrical resistance, the actual temperature may be ascertained continuously, the measurement values being used to control the heating unit of the present invention. The layer acting as the temperature sensor preferably is fitted with a PTC or an NTC substance. Alternatively a thermocouple may be used as the temperature sensor having the same geometry as an electrical resistance sensor and with the measuring point configured near the nozzle tip.

The layer respectively the thermocouple acting as the temperature sensor and the heating layer advantageously are configured radially in a common plane, as a result of which the space required by the heating unit of the present invention can be reduced further. At least one electrically insulating contacting layer may be configured for improved thermal contact between the two layers.

Preferably the support is made of a sintered substance such as a ceramic or a sintered metal. However a metal, an alloy of metals, a steel or an alloy of steels may be used. Using a ceramic offers the advantage that the heating layer can be directly deposited on the support. If an electrically conducting substance such as a metal, for instance a tool steel, a hard metal or the like, or also a steel are used, an insulating layer shall be configured between the support and the heating layer to electrically insulate the heating layer from the support.

However such an insulating intermediate layer also may be present on a ceramic support, for instance to improve adhesion.

Preferably the cover layer and the insulating layer acting as the intermediary layer each is a vitreous and/or ceramic dielectric layer which, following at least one firing procedure shall be pressure prestressed relative to the support, as a result of which delamination forces arising at different levels in radial dependency when the support is loaded by inner prestressing can be compensated within the insulating layer. Preferably pressure prestressing is attained in predetermining as a function of the pertinent expansion parameters of the support in each case a specific mismatch between the linear expansion coefficient of the ceramic insulating layer $TEC_{DE}$ respectively the linear thermal expansion coefficient $TEC_{DEA}$ of the cover layer and the corresponding support value $TEC_M$, the differential expansion $TEC_{DE}-TEC_M$ respectively $TEC_{DEA}-TEC_M$ not exceeding $5 \cdot 10^{-6}\ K^{-1}$.

Moreover the insulating layer and/or the cover layer preferably shall be able to wet the support surface at the particular firing temperature. Advantageously, in some circumstances, the material system at least partly shall be converted into the crystalline state.

The insulating layer and/or the cover layer may comprise a vitreous or vitreous-crystalline material system containing at least one preformed glass that, at a predetermined firing temperature, shall wet the support's surface. Said substance system moreover may contain at least one preformed glass that is converted at least partly into a crystalline state at a predetermined firing temperature.

Additionally respectively alternatively the substance system may contain a further glass not crystallizing under firing and/or at least one a priori crystalline compound, where, by optimizing the quantitative proportions of the preformed vitreous and crystalline components of the substance system, and while taking into account their particular TEC increments under the conditions of the particular firing procedure, a ceramic dielectric layer shall be produced with a TEC value in the range between 0 and $13 \cdot 10^{-6}\ K^{-1}$.

Additionally a compensating layer may be configured between the support and the insulating layer and illustratively it may be a chemical nickel. Such a compensating layer also serves to compensate different thermal expansion coefficients between the support substance and the insulating layer. The compensating layer may be deposited in the same way as the insulating layer and the cover layer.

Preferably the insulating layer and/or the cover layer and/or the compensating layer is a fired foil or a fired thick-film paste. However the layers also may be deposited by detonation coating or thermal coating. Alternatively dip coating with subsequent firing also may be employed.

The design and/or the configuration of the heating conductor tracks within the heating layer is matched to the particular heat output requirement. Consequently the heating conductor track segments of a material feed pipe segment to be subsequently mounted on a material feed pipe segment requiring especially large heating may be designed with a slimmer or larger cross-section in order to release more or less thermal energy in this segment.

If the heating conductor track is coil-like or meandering, the coil pitch may be selected segment-wise to be smaller or larger to vary the release of heat energy. Also track separations varying segment-wise may be selected.

To prevent higher spot-wise temperatures (so-called "hot spots") at the reversal points of the heating conductor tracks, a further development of the present invention provides that the meandering heating conductor tracks be fitted at or in their reversal points with at least segment-wise with an additional conducting layer. These layer bridges link respectively widen adjacent heating conductor track segments, as a result of which the resistance of the electrical heating conductor track at the reversal points is designed to be slightly less than in the other areas. Accordingly the heating unit provides an exceedingly uniform temperature distribution.

The conducting layer bridges preferably are deposited in the form of foils or thick film pastes on the heating conductor layer. However the layers also may be deposited by detonation coating or thermal coating.

A contacting layer may be configured in each instance between the heating conductor layer and/or the temperature sensor. Again this layer and/or the electric resistance layer acting as a temperature sensor and/or insulating respectively the adhesive intermediate (insulating) layer configured between the support and the heating conductor track preferably shall selectively be fired foils or fired thick film pastes. They may be deposited in simple and economic manner, in particular they may be easily structured and handled, as a result of which it is possible to manufacture an exceedingly reliable and advantageous heating unit.

Altogether the insulating layer, the heating layer, the cover layer, the contacting layer and the layer serving as the temperature sensor preferably constitute a layered compound, whereby the heating unit of the present shall always be compact.

The present invention moreover relates to a hot runner system, in particular a hot runner nozzle or a hot runner manifold fitted with an electrical heating unit as described above. Said electrical heating unit is mounted respectively slipped by means of the tubular or muff-like support on a material feed pipe, a bar, a manifold arm, a nozzle or the like.

Furthermore the present invention relates to a hot runner nozzle fitted with an electric heating unit, said heating unit respectively the tubular or muff-like support being mounted on a material feed pipe at a clearance fit with a predetermined clearance.

Lastly the present invention relates to a method for manufacturing an electric heating unit for hot runner systems, in particular for hot runner nozzles and/or hot runner manifolds, the heating layer and/or the insulating layer and/or the cover layer and/or the contacting layer and/or the layer serving as the temperature sensor being deposited in by foil or screen printing techniques. Such a deposition technique is easily controlled and economical. The produced layers may be deposited accurately with attendant good temperature distribution and heating element service life.

The screen-printed layers advantageously are deposited, using the wraparound technique in the form of pastes, assuring procedural economy.

Each layer may be deposited separately and be fired at different temperatures. Illustratively a resistive substance such as platinum may be used on the ceramic support, said resistive substance being fired at a temperature higher than applied to the cover layer fired in the next step. Alternatively the resistive substance together with the substance used for the temperature sensor may be fired simultaneously and at a higher temperature than the cover layer fired in the subsequent step. Alternatively also all layers once deposited may be fired simultaneously (co-fired). Preferably the firing temperature range is between 800 and 1,400° C.

Further features, particulars and advantages of the present invention are defined in the claims and are discussed in the description below of illustrative embodiments shown in the appended drawings.

Below the same references denote similar components.

Figure 1:
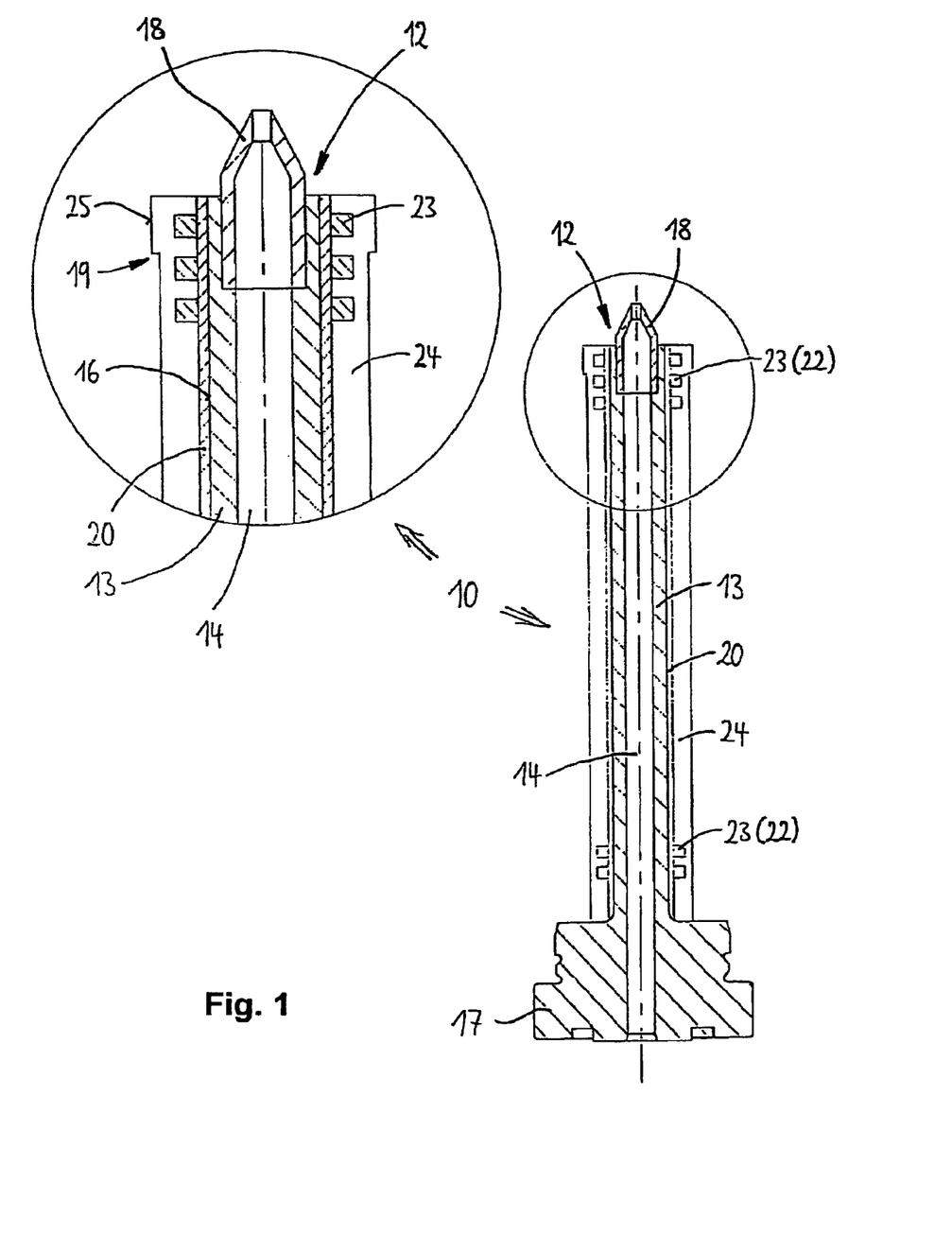
FIG. 1 is a schematic sectional view of a hot runner nozzle of the invention fitted with a first embodiment of a heating unit of the invention.

The hot runner nozzle 12 sketched in FIG. 1 is part of an injection molding equipment processing thermoplasts and shall be affixed to an omitted manifold and is fitted with an omitted housing receiving a cylindrical material feed pipe 13. A base 17 at the end of said pipe terminates flush with the housing and rests in sealing manner against a manifold. A nozzle tip 18 is inserted, preferably screwed, into the end of the material feed pipe 13 running in the axial direction and extends the flow duct 14 subtended in the material feed pipe 13 as far as the omitted plane of an omitted mold nest. The nozzle tip 18 also may be integral with the material feed pipe 13, its operation remaining the same.

Figure 2:
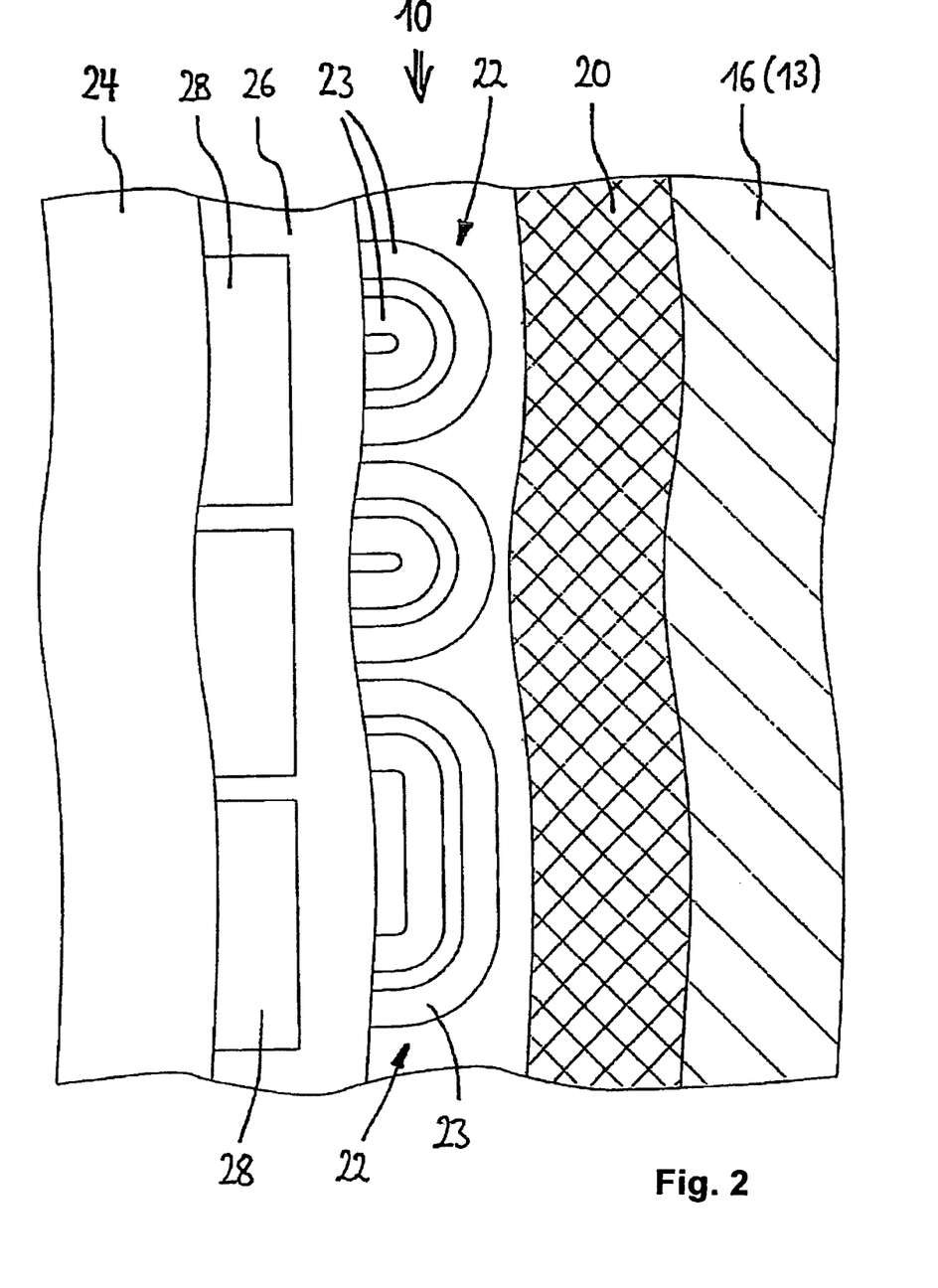
FIG. 2 shows the heating unit of FIG. 1 in a geometrically developed and partly fanned out representation.

A heating unit 10 is slipped onto the circumference of the wall 16 of the material feed pipe 13 made of steel. Said heating unit comprises a muff-like ceramic support 20, which simultaneous serves as electric insulation, and above latter there is a deposited heating layer 22 which, as schematically indicated in FIG. 2, comprises meandering heating conductor tracks 23, further an outer cover layer 24 which externally covers and electrically insulates the heating conductor tracks 23 and the support 20 below. The heating conductor tracks 23 may be deposited/arrayed in arbitrary manner depending on the needed electric power at different densities and configurations on the support 20. In this manner a defined temperature distribution may be attained within the material feed pipe 13.

To monitor respectively control and regulate both the rise in and the evolution of the temperature within the material feed tube 13 respectively within the wall 16, at least one layer 28 made of a PTC substance acting as a temperature sensor is configured at least segment-wise between the heating layer 22 and the cover layer 24, the electric resistivity of said layer 28 increasing with rising temperature (FIG. 2). Also a thermocouple made of a suitable substance may be used instead of using a temperature-dependent resistive substance. To attain improved thermal contact, an electrically insulating contact layer 26 is situated between the layer 28 acting as the temperature sensor and an electrically insulating contact layer 26 which as needed also may be configured between further layers.

Figure 3:
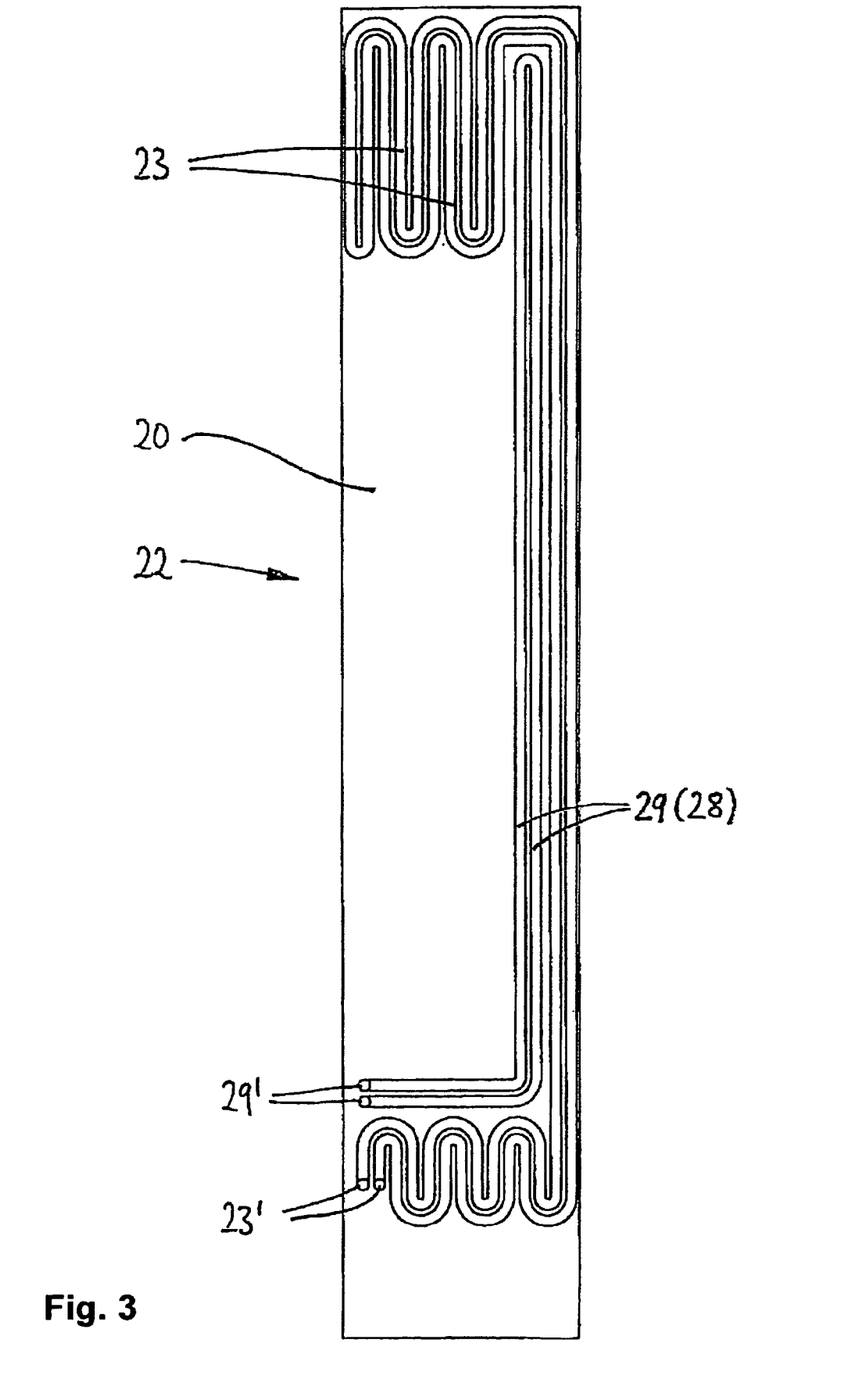
FIG. 3 shows the heating unit of FIGS. 1 and 2 fitted with a thermal sensor shown in geometrically developed form.
Figure 4:
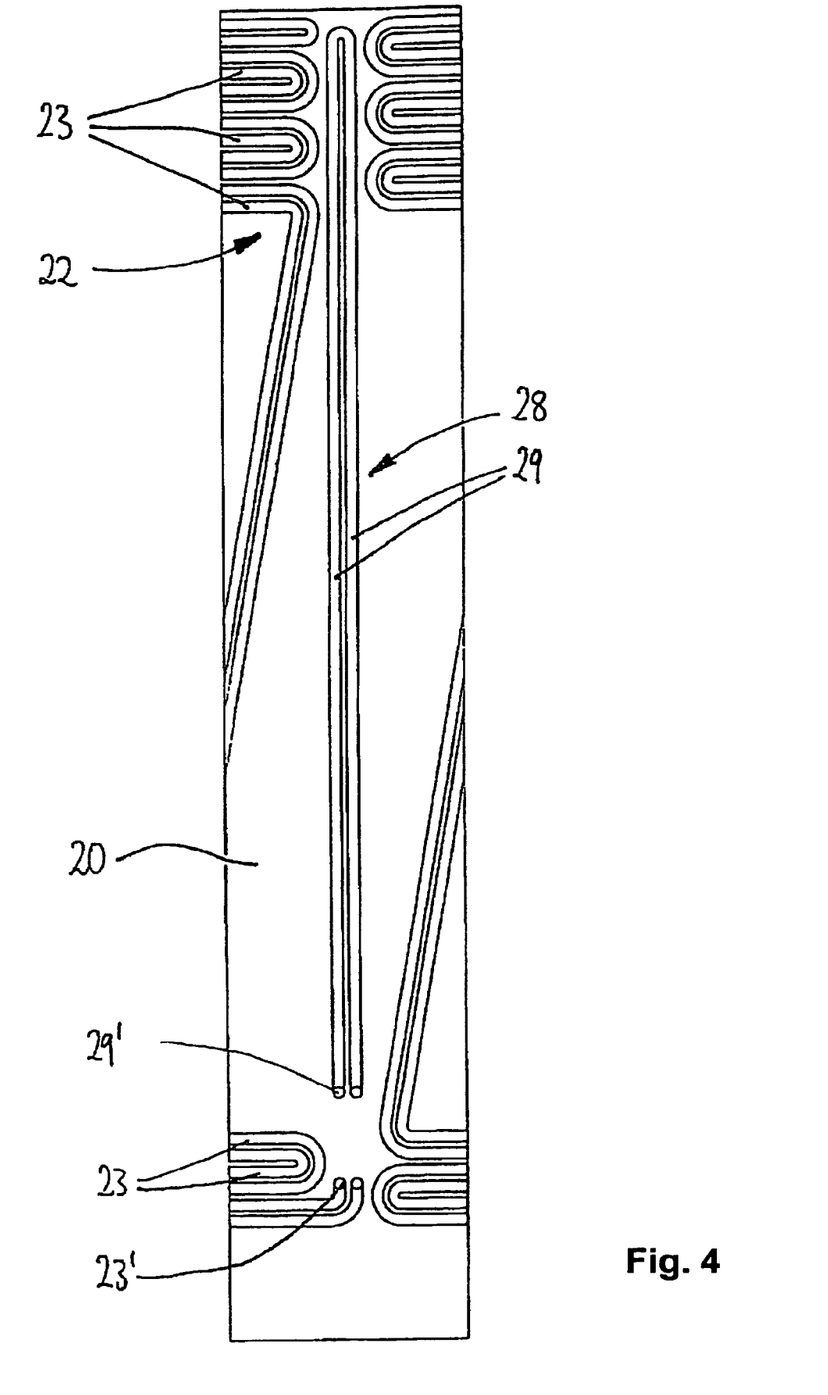
FIG. 4 shows another kind configuration of a heating unit and a temperature sensor.
Figure 5:
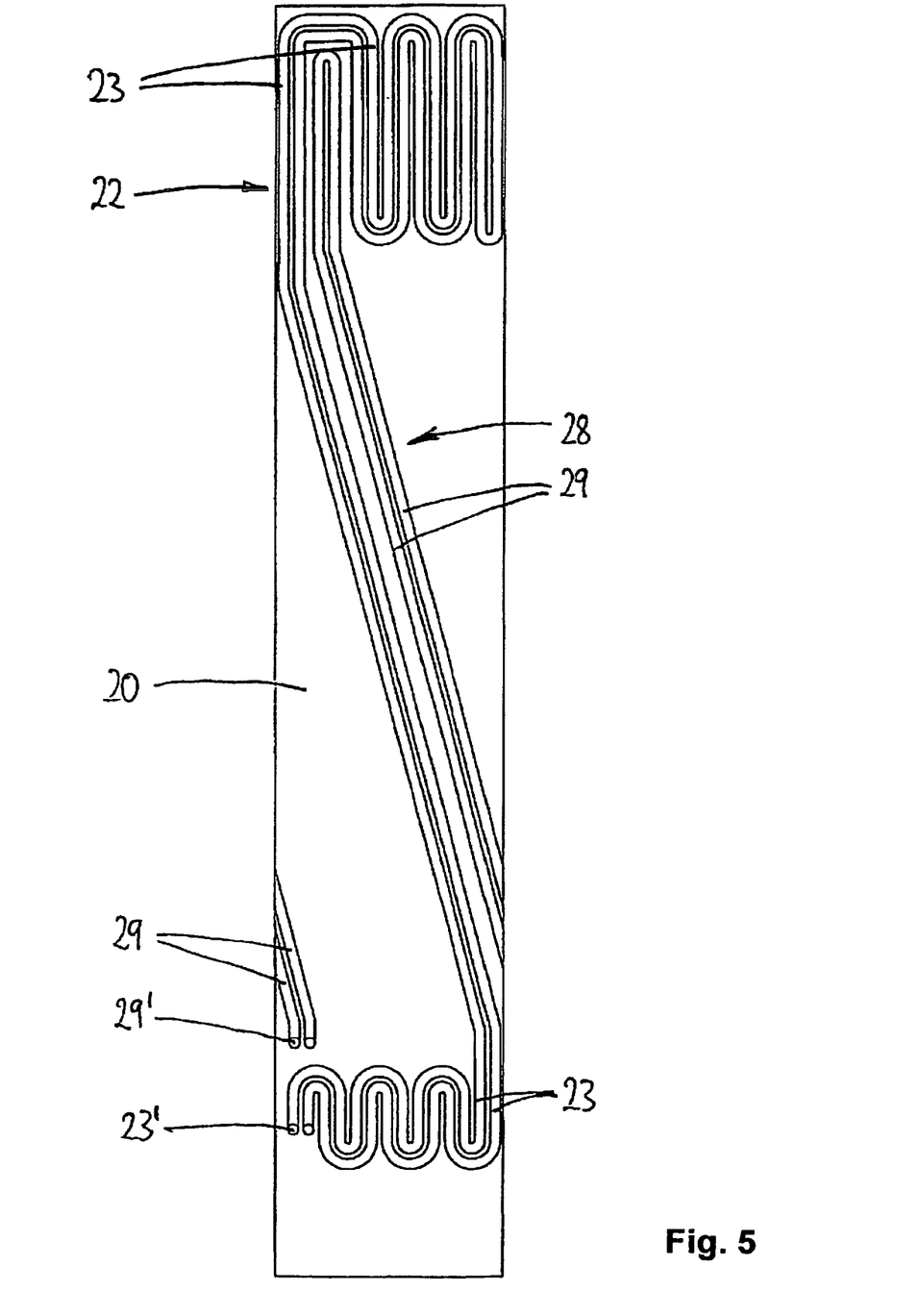
FIG. 5 shows still another embodiment mode of heating unit with a thermal sensor.

Just as is the heating layer 22, the layer 28 acting as the temperature sensor may be fitted with electrically conducting tracks 29 which, being thermocouples acting as temperature sensors, measure the temperature (FIG. 4). The conductor tracks 29 appropriately are situated in the same plane as the heating conductor tracks 23 of the heating layer 22 and are protected jointly with latter from the ambience by the cover layer 24. In this manner the height of the heating unit 10 is minimized. FIGS. 3, 4 and 5 show alternative ways to structure the heating conductor tracks 23 and the temperature measurement conductor tracks 29.

Figure 7:
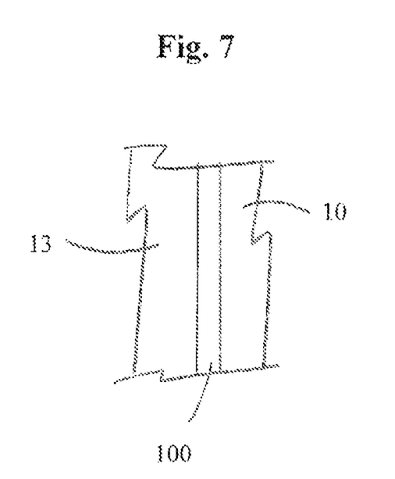
FIG. 7 shows a schematic representation of clearance between the heating unit and the feed pipe of FIG. 1.

Each layer 22, 24, 26, 28 is integrally deposited by direct coating on the support 20 and then is fired according to the particular substance-specific firing conditions, resulting in an integral layer-compound constituting the heating unit 10. Because the individual functional layers 20, 22, 24, 26, 28 of the layer-compound due to their substance-specific very similar designs also are exceedingly mutually adhesive, the heating unit 10 as a whole durably withstanding even extreme mechanical and/or thermal stresses. After the layer compound has been manufactured, the heating unit 10 is slipped onto the material feed pipe 13 at a predetermined clearance selected in a way that in its heated state, the heating unit 10 cannot be damaged by the material feed pipe 13 of greater thermal expansion while nevertheless good heat transfer between the support 20 and the material feed pipe 13 is assured. FIG. 7 is a schematic diagram that shows the predetermined clearance 100 between the heating unit 10 and the material feed pipe 13. The predetermined clearance 100 is shown exaggerated in size for illustration purposes.

Heat transfer may be further improved by additionally roughening the inside of the support respectively the outside of the material feed pipe. Improved heat transfer also is attained by a dark or black paint on the inside of the support respectively the outside of the material feed pipe. Illustratively this layer may consist of a black paint such as used for heat radiating elements. Alternatively or additionally, a dark substance, for instance a dark ceramic may be used for the support, for instance black aluminum oxide. When a metallic support is used, the metal may be deliberately tarnished darkly at the inside of the support [tube] due to the firing procedure.

An appropriate coating procedure to deposit the individual functional layers is offered by the foil printing and the thick-film screen printing technology and as regards depositing the insulating layer and/or the cover layer as called for by the detonation coating or thermal coating procedures. Preferably however the thick-film screen technology using wraparound shall be used. Layer firing may be carried out individually or jointly.

The electric terminals 23' and 29' for the heating conductor tracks 23 and for the layer 28 acting as the temperature sensor also are carried out by the thick-film technique, the required electrical contacts being designed in a manner that the electric power supply respectively the data transmission may be implemented by plug-in cable connections.

Figure 6:
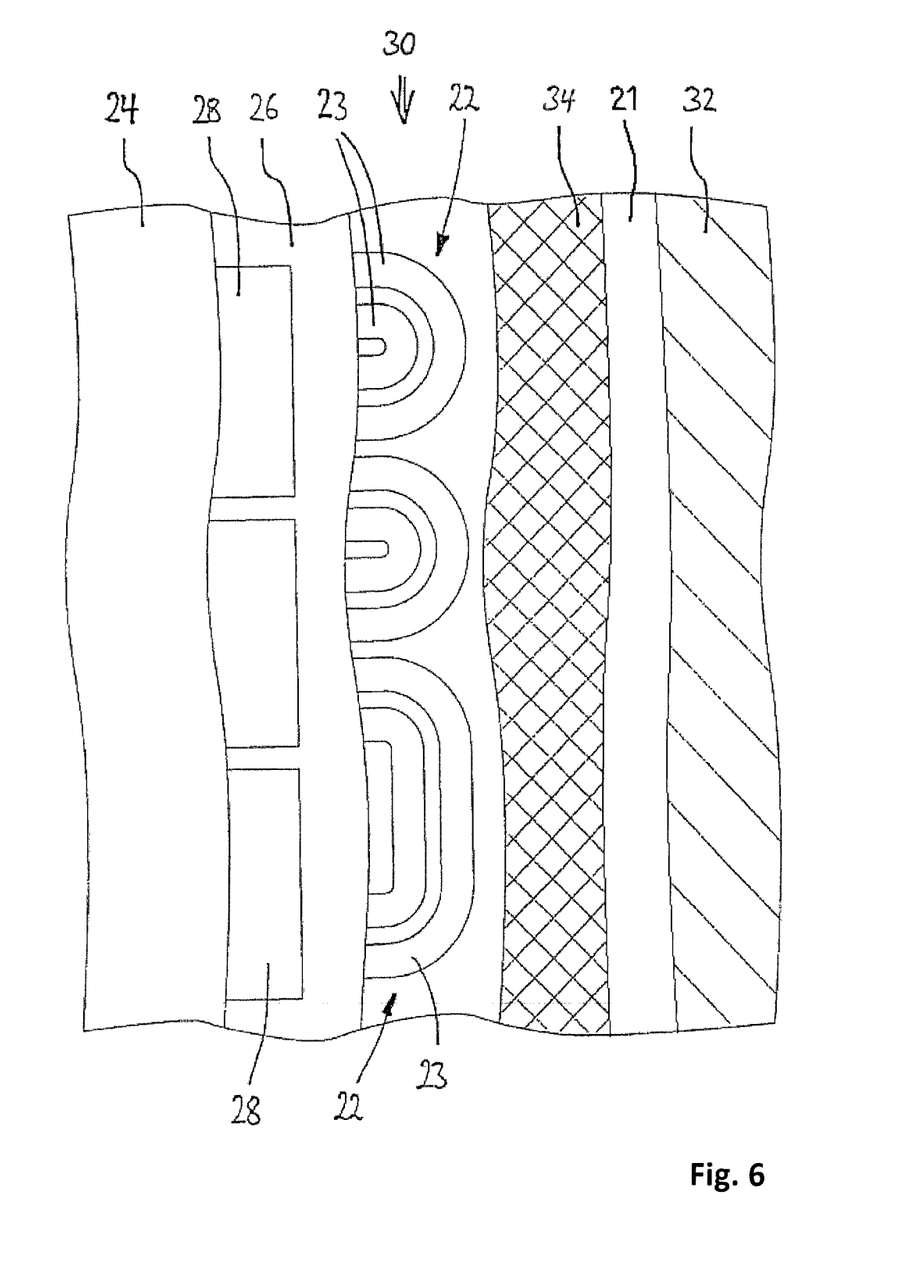
FIG. 6 shows an alternative embodiment of a heating unit of the invention in a geometrically developed and partly unfolded representation.

FIG. 6 shows an alternative embodiment mode of a heating unit 30 of the present invention in a geometrically developed and partly fanned-out representation. The heating unit 30 comprises a tubular or muff-like support 32 substantially corresponding to the support 20 of FIGS. 1 and 2 of the heating unit 10, however not being made of a ceramic but instead of a metal or a metal alloy. The electric insulation is implemented by an insulating layer respectively dielectric layer 34 mounted on the support 20, and, subsequently to the deposition of said layer, it is fitted consecutively with the heating layer 22, the contacting layer 26, the layer 28 constituting a temperature sensor and the cover layer 24—as is the case for the heating unit 10 of FIG. 2. The individual functional layers are deposited in the same manner as is the case for the heating unit 10.

A thick-film paste is deposited on the surface—conventionally roughened to improve adhesion—of support 32 to produce the dielectric layer 34 by the wraparound procedure. The solid content of said paste illustratively may be in the form of an in-situ crystallizing glass when in a temperature range above 900° C. and having the components BaO, Al$_2$O$_3$ and SiO$_2$ of the approximate molar composition BaO Al$_2$O$_3$ 4SiO$_2$. The TEC of the dielectric layer 32 following firing is 6·10$^{-6}$ K$^{-1}$ in the temperature range of 20 to 300° C. Also shown in FIG. 6 is a compensation layer 21 disposed between the support 32 and the insulating dielectric layer 34.

Due to the ensuing TEC mismatch between the metal wall 16 and the dielectric layer 34 of the order of magnitude of 5·10$^{-6}$ K$^{-1}$, the cooled wall 16 of the support 32 covered with the dielectric layer will be in the range of purely elastic deformation, that is between the glass' transformation temperature of about 700° C. and room temperature, giving rise to anticipated pressure stresses of about 3,500 bars (for an assumed dielectric layer (34) Young's modulus of 2·10$^6$ bars). The level of the pressure prestressing does not yet reach the critical boundary zone of the intrinsic mechanical strength of the dielectric which begins at 6,000 bars. However such level is sufficient to reliably preclude the occurrence of tensile strains in the dielectric layer 34 and hence in the subsequent layers 22, 24 when the wall 16 of the support 32 is cyclically loaded at 2,000 bars.

The present invention is not restricted to one of the above described illustrative embodiment modes. Instead modifications and changes are conceivable without transcending the range of protection of the present invention as defined by the appended claims. Illustratively the insulating layer and/or the cover layer may be fitted with a vitreous or vitreous-crystalline substance system containing at least one preformed glass which shall wet the support's surface at a predetermined firing temperature. The substance system moreover may contain at least one preformed glass that shall at least be partly converted into a crystalline state at a predetermined firing temperature.

Additionally respectively alternatively the substance system may contain a further glass which does not crystallize under firing conditions and/or it may contain at least one a priori crystalline compound, optimizing the quantitative proportions of the preformed vitreous and crystalline components of the substance system while taking into account their particular TEC increments under the conditions of the particular firing procedure resulting in a ceramic dielectric layer having a TEC value in the range between 0 and 9·10$^{-6}$ K$^{-1}$.

The insulating layer and/or the cover layer preferably is—like the compensating layer—a fired foil or a fired thick-film paste. All three also may be deposited by detonation coating or thermal coating. Alternatively dip-coating with subsequent firing may be employed.

All features and advantages implicit in and explicit from the claims, specification and drawings including manufacturing details, spatial configurations and procedural steps, may be construed being inventive per se or in arbitrary combination(s).

LIST OF REFERENCES 10 heating unit
12 hot runner nozzle
13 material feed pipe
14 flow duct
16 wall
17 base zone
18 nozzle tip
20 support
22 heating layer
23 heating conductor tracks
23' electric connection terminal
24 cover layer
26 contacting layer
28 layer serving as temperature sensor
29 conductor tracks
29' electric connection terminal
30 heating unit
32 support
34 dielectric layer

The invention claimed is:

1. A hot runner nozzle having a cylindrical material feed pipe and an electrical heating unit, the material feed pipe comprising:
    a first end and a second end;
    a wall;
    a base at the first end of the cylindrical material feed pipe; and
    a nozzle tip at the second end of the cylindrical material feed pipe; and
    the heating unit comprising:
    a tubular or muff-like support made of a sintered ceramic;
    a heating layer deposited on said ceramic support, said heating layer comprising meandering heating conductor tracks; and
    an outer cover layer externally covering and electrically insulating the heating conductor tracks and the tubular or muff-like support below; wherein
    the heating layer and the cover layer being a fired foil or a fired thick-film paste; wherein
    the cylindrical material feed pipe has a greater thermal expansion than the tubular or muff-like support; and further wherein
    in a first state before heating the tubular or muff-like su ort of the heating unit is slipped at a clearance fit with a predetermined clearance on the cylindrical material feed pipe, the clearance fit allowing the heating unit to be exchanged in the first state, the predetermined clearance being such that in a second state, which is a heated state of the heating unit, an expansion of the cylindrical material feed pipe as a result of the thermal expansion of the cylindrical material feed pipe being greater than the thermal expansion of the tubular or muff-like support achieves a direct heat transfer between the tubular or muff-like support and the cylindrical material feed pipe.

2. The hot runner nozzle as claimed in claim 1, characterized by at least one further electrically conducting layer acting as a temperature sensor, the electrical resistance of said layer being temperature dependent.

3. The hot runner nozzle as claimed in claim 2, characterized in that the layer serving as a temperature sensor comprises a PTC or an NTC substance.

4. The hot runner nozzle as claimed in claim 2, characterized in that the layer acting as a temperature sensor is a thermocouple and is made of a substance suitable to generate a thermoelectric voltage.

5. The hot runner nozzle as claimed in claim 2, characterized in that the layer acting as a temperature sensor and the heating layer radially are situated in one plane.

6. A hot runner nozzle having a cylindrical material feed pipe and an electrical heating unit, the material feed pipe comprising:
    a first end and a second end;
    a wall;
    a base at the first end of the cylindrical material feed pipe; and
    a nozzle tip at the second end of the cylindrical material feed pipe; and
    the heating unit comprising:

a tubular or muff-like support made of a metal, a metal alloy, steel or a steel alloy;

an insulating layer deposited on the tubular or muff-like support;

a heating layer deposited on said insulating layer, said heating layer comprising meandering heating conductor tracks; and an outer cover layer externally covering and electrically insulating the heating conductor tracks and the insulating layer; wherein the cylindrical material feed pipe has a greater thermal expansion than the tubular or muff-like support; wherein the heating layer, the insulating layer, and the cover layer being a fired foil or a fired thick-film paste, and in a first state before heating, the tubular or muff-like support of the heating unit is slipped at a clearance fit with a predetermined clearance on the cylindrical material feed pipe, the clearance fit allowing the heating unit to be exchanged in the first state, the predetermined clearance being such that in a second state, which is a heated state of the heating unit, an expansion of the cylindrical material feed pipe as a result of the thermal expansion of the cylindrical material feed pipe being greater than the thermal expansion of the tubular or muff-like support achieves a direct heat transfer between the tubular or muff-like support and the cylindrical material feed pipe.

7. The hot runner nozzle as claimed in claim 6, characterized in that a compensating layer is configured between the tubular or muff-like support and the insulating layer.

8. The hot runner nozzle as claimed in claim 6, characterized in that the insulating layer and/or the cover layer is a vitreous and/or ceramic dielectric layer.

9. The hot runner nozzle as claimed in claim 6, characterized in that the insulating layer and/or the cover layer subsequently to at least one firing procedure is pressure-prestressed relative to the tubular or muff-like support.

10. The hot runner nozzle as claimed in claim 9, characterized in that the linear thermal coefficient of expansion (TEC) of the insulating layer and/or the linear thermal coefficient of expansion (TEC) of the cover layer following the firing procedure is smaller than the linear thermal coefficient of expansion (TEC) of the tubular or muff-like support.

11. The hot runner nozzle as claimed in claim 6, characterized in that the insulating layer and/or the cover layer is a fired foil and/or a fired thick-film paste.

12. The hot runner nozzle as claimed in claim 6, characterized in that the meandering heating conductor tracks at and/or in turning points thereof are fitted at least segment-wise with an additional conducting layer.

13. The hot runner nozzle as claimed in claim 6, characterized in that one contact layer each is fitted between the insulating layer, the heating layer and/or the layer acting as the temperature sensor.

14. The hot runner nozzle as claimed in claim 6, characterized in that the contacting layer and/or the layer acting as the temperature sensor are fired foils or fired thick-film pastes.

15. The hot runner nozzle as claimed in claim 6, characterized in that the insulating layer and/or the heating layer and/or the cover layer and/or the compensating layer and/or the contacting layer and/or the layer acting as the temperature sensor constitute a compound of layers.

16. The hot runner nozzle as claimed in claim 6, characterized in that the inner side of the tubular or muff-like support of the electric heating unit and/or the outer side of the material feed pipe are roughened slightly or substantially.

17. The hot runner nozzle as claimed in claim 6, characterized in that the inner side of the tubular or muff-like support of the electric heating unit and/or the outer side of the material feed pipe is coated darkly or is tarnished darkly by heat treatment.

18. The hot runner nozzle as claimed in claim 6, characterized by at least one further electrically conducting layer acting as a temperature sensor, the electrical resistance of said layer being temperature dependent.

19. The hot runner nozzle as claimed in claim 18, characterized in that the layer serving as a temperature sensor comprises a PTC or an NTC substance.

20. The hot runner nozzle as claimed in claim 18, characterized in that the layer acting as a temperature sensor is a thermocouple and is made of a substance suitable to generate a thermoelectric voltage.

21. The hot runner nozzle as claimed in claim 18, characterized in that the layer acting as a temperature sensor and the heating layer radially are situated in one plane.

22. The hot runner nozzle as claimed in claim 1, characterized in that the cover layer is a vitreous and/or ceramic dielectric layer.

23. The hot runner nozzle as claimed in claim 1, characterized in that the cover layer subsequently to at least one firing procedure is pressure-prestressed relative to the tubular or muff-like support.

24. The hot runner nozzle as claimed in claim 23, characterized in that the linear thermal coefficient of expansion (TECDEA) of the cover layer following the firing procedure is smaller than the linear thermal coefficient of expansion (TECM) of the tubular or muff-like support.

25. The hot runner nozzle as claimed in claim 1, characterized in that the cover layer is a fired foil and/or a fired thick-film paste.

26. The hot runner nozzle as claimed in claim 1, characterized in that the meandering heating conductor tracks at and/or in their turning points are fitted at least segment-wise with an additional conducting layer.

27. The hot runner nozzle as claimed in claim 1, characterized in that the heating layer and/or the cover layer and/or a layer acting as the temperature sensor constitute a compound of layers.

* * * * *